(12) United States Patent
Huang et al.

(10) Patent No.: US 11,877,331 B2
(45) Date of Patent: Jan. 16, 2024

(54) METHOD AND SYSTEM FOR SMART BLUETOOTH OPERATION SWITCHING BASED ON BEACON BROADCAST

(71) Applicant: Shenzhen Shengrun Technology Co., Ltd, Shenzhen (CN)

(72) Inventors: Jie Huang, Shenzhen (CN); Chihua Chen, Shenzhen (CN); Yan Zhang, Shenzhen (CN)

(73) Assignee: Shenzhen Shengrun Technology Co., Ltd, Shenzhen (CN)

( * ) Notice: Subject to any disclaimer, the term of this patent is extended or adjusted under 35 U.S.C. 154(b) by 79 days.

(21) Appl. No.: 17/754,801

(22) PCT Filed: Aug. 28, 2020

(86) PCT No.: PCT/CN2020/112211
§ 371 (c)(1),
(2) Date: Apr. 12, 2022

(87) PCT Pub. No.: WO2022/007149
PCT Pub. Date: Jan. 13, 2022

(65) Prior Publication Data
US 2023/0209623 A1 Jun. 29, 2023

(30) Foreign Application Priority Data
Jul. 8, 2020 (CN) .......................... 202010653245.X (51) Int. Cl.
*H04W 76/14* (2018.01)
*H04B 17/318* (2015.01)
(Continued)

(52) U.S. Cl.
CPC .......... *H04W 76/14* (2018.02); *H04B 17/318* (2015.01); *H04W 4/029* (2018.02);
(Continued)

(58) Field of Classification Search
CPC ........... G07C 2009/00365; G07C 2009/00373; G07C 2009/0038; G07C 2009/00388;
(Continued)

(56) References Cited

U.S. PATENT DOCUMENTS 10,885,729 B2 * 1/2021 Stitt ...................... G01S 5/0284

FOREIGN PATENT DOCUMENTS

| CN | 104077169 A | 10/2014 |
| CN | 106127890 A | 11/2016 |

(Continued)

OTHER PUBLICATIONS

Wang et al., "RSSI-Based Bluetooth Indoor Localization," 2015 11th International Conference on Mobile Ad-hoc and Sensor Networks (MSN), Shenzhen, China, 2015, pp. 165-171, doi: 10.1109/MSN.2015.14. (Year: 2015).*

(Continued)

*Primary Examiner* — Thomas R Cairns
(74) *Attorney, Agent, or Firm* — Bayramoglu Law Offices LLC (57) ABSTRACT

A method and a system for smart Bluetooth operation switching based on a beacon broadcast are provided. A Bluetooth device transmits the beacon broadcast; a mobile terminal scans the beacon broadcast and, by parsing the beacon broadcast, the mobile terminal determines whether to wake up an application program; sending a parsed beacon broadcast to the application program, and identifying feature data of a Bluetooth device connectable broadcast set in the beacon broadcast; the Bluetooth device transmits a connectable broadcast; the mobile terminal connects to the connectable broadcast and performs an identity verification; acquiring a received signal strength indicator (RSSI) signal strength between the Bluetooth device and the mobile terminal, and mutually calculating position information to (Continued)

obtain a relative distance of the Bluetooth device and the mobile terminal; and, when the relative distance reaches a threshold, executing a corresponding switch action.

15 Claims, 2 Drawing Sheets (51) Int. Cl.
*H04W 84/18* (2009.01)
*H04W 4/70* (2018.01)
*H04W 4/80* (2018.01)
*H04W 4/029* (2018.01)
*H04W 4/48* (2018.01)
*H04W 4/40* (2018.01)
*G07C 9/00* (2020.01)

(52) U.S. Cl.
CPC ............... *H04W 4/70* (2018.02); *H04W 4/80* (2018.02); *H04W 84/18* (2013.01); *G07C 2009/00365* (2013.01); *G07C 2009/00388* (2013.01); *G07C 2209/61* (2013.01); *G07C 2209/63* (2013.01); *H04W 4/40* (2018.02); *H04W 4/48* (2018.02)

(58) Field of Classification Search
CPC ........... G07C 2009/00396; G07C 2009/00404; G07C 2209/61; G07C 2209/63; G07C 2209/64; H04B 17/318; H04B 17/328; H04W 4/02; H04W 4/029; H04W 4/06; H04W 4/40–48; H04W 4/70; H04W 4/80; H04W 76/14; H04W 76/40; H04W 84/18
See application file for complete search history.

(56) References Cited

FOREIGN PATENT DOCUMENTS

| CN | 206406889 U | 8/2017 |
|---|---|---|
| CN | 110086926 A | 8/2019 |
| CN | 110401913 A | 11/2019 |
| WO | 2019069257 A1 | 4/2019 |

OTHER PUBLICATIONS

Bekkelien et al. "Bluetooth indoor positioning." Master's thesis, University of Geneva (2012), pp. 1-49 (Year: 2012).*

* cited by examiner

Fig. 1

Fig. 2

METHOD AND SYSTEM FOR SMART BLUETOOTH OPERATION SWITCHING BASED ON BEACON BROADCAST

CROSS REFERENCE TO THE RELATED APPLICATIONS

This application is the national stage entry of International Application No. PCT/CN2020/112211, filed on Aug. 28, 2020, which is based upon and claims priority to Chinese Patent Application No. 202010653245.X, filed on Jul. 8, 2020, the entire contents of which are incorporated herein by reference.

TECHNICAL FIELD

The present invention relates to the field of BLUETOOTH communications, and in particular to a method and a system for smart BLUETOOTH operation switching based on a beacon broadcast.

BACKGROUND

With the rapid development of science and technology, people's desire to enjoy the convenience brought by science and technology is more and more intense. In many scenarios, people want to be able to free their hands and solve problems easily and conveniently through a humanized smart system. For example, in a family life scenario, when going home from shopping at a supermarket with both hands full of the bought goods, in a traditional scenario, people need to put down the goods in their hands and then take a key or enter a password, or enter a fingerprint.

For this way of unlocking, in the traditional driving scenario, a driver needs to carry a vehicle key. When opening the door, it is either to start the unlocking key on the vehicle key, or to implement vehicle-type inductive unlocking equipped with the keyless function. While in the above-mentioned example scenario, the convenience brought to the user is far from enough. Because carrying a key, the manual operation, and like troubles, are more or less annoying to people in life. However, for some existing keyless unlocking applications, the background resident system needs to improve the level of the APP BLUETOOTH service and reduce the memory occupied by an APP. For example, in the beginning, the signal detection work is realized by the APP, and due to the requirement of detection sensitivity, a device needs to frequently send a signal to the APP such that the APP occupies a large memory. As the system performs recycling when the background runs for more than ten minutes, the APP thus exits from running, resulting in the problem that the APP is closed and the keyless unlocking cannot be actually realized.

SUMMARY

In order to overcome the deficiencies of the prior art, the present invention provides a method and a system for smart BLUETOOTH operation switching based on a beacon broadcast such that the switching control of the automobile is more convenient.

In order to achieve the above object, the specific solution adopted by the present invention is as follows:

The present invention provides a method for smart BLUETOOTH operation switching based on a beacon broadcast, comprising the following steps:

S10, a BLUETOOTH device transmitting a beacon broadcast;

S20, a mobile terminal scanning the beacon broadcast and, by means of parsing the beacon broadcast, the mobile terminal determining whether to wake up an application program; if so, then waking up the application program and entering step S30; if not, then not waking up the application program and continuing step S20;

S30, sending a parsed beacon broadcast to the application program, and identifying feature data of a BLUETOOTH device connectable broadcast set in the beacon broadcast;

S40, the BLUETOOTH device transmitting the connectable broadcast;

S50, the mobile terminal connecting to the connectable broadcast and performing identity verification; if a connection is successful, then entering step S60; if not, then continuing step S50;

S60, acquiring an RSSI signal strength between the BLUETOOTH device and the mobile terminal and mutually calculating position information to obtain a relative distance of the BLUETOOTH device and the mobile terminal;

and S70, when a calculated relative distance reaches a threshold, executing a corresponding switch action.

As a preference, in step S60, the BLUETOOTH device comprises a BLUETOOTH master device and at least one BLUETOOTH device scanning end, and the RSSI signal strength comes from a link heartbeat packet between the mobile terminal and the BLUETOOTH device, the specific method comprising:

S61, the BLUETOOTH device scanning end starting BLUETOOTH link tracking to monitor connecting condition between a current mobile terminal and a current BLUETOOTH master device in real time;

S62, the BLUETOOTH device scanning end performing autonomous frequency hopping tracking according to the connecting condition between the current mobile terminal and the current BLUETOOTH master device;

S63, the BLUETOOTH device scanning end intercepting packet data between the current mobile terminal and the current BLUETOOTH master device according to the connecting condition between the two;

and S64, according to packet information, parsing a physical position of the BLUETOOTH device scanning end and the RSSI signal strength fed back by the BLUETOOTH device scanning end, and according to the physical position and the RSSI signal strength fed back correspondingly, calculating position and distance information between the mobile terminal and the BLUETOOTH master device.

As a preference, in step S61, by establishing a connection between the mobile terminal and the BLUETOOTH master device, the BLUETOOTH master device sends connection channel frequency hopping route information to the BLUETOOTH device scanning end; the BLUETOOTH device scanning end realizes autonomous frequency hopping according to the frequency hopping route information; and after frequency hopping to a corresponding channel is performed, a current channel connecting condition is monitored in real time;

in step S62, after the BLUETOOTH master device is connected to the mobile terminal, frequency hopping route information is sent to the BLUETOOTH scanning end, and the BLUETOOTH scanning end deploys a new frequency hopping path according to the route information;

in step S63, after acquiring the connected frequency hopping route information, the BLUETOOTH master device sends the same to the BLUETOOTH device scanning end, and the BLUETOOTH device scanning end deploys to a new frequency hopping path in real time according to the frequency hopping route, tracks interaction data, and transmits back packet information to the BLUETOOTH master device;

in step S64, the interaction information between the BLUETOOTH master device and the mobile terminal, and the physical position information about the BLUETOOTH device scanning end are parsed according to the packet information; the RSSI signal strength is extracted according to the interaction information; relative position and distance information between the BLUETOOTH master device and the mobile terminal is ascertained according to the physical position information about the BLUETOOTH device scanning end and the RSSI signal strength.

As a preference, the packet information extracts identity information of the mobile terminal and the RSSI signal strength information according to communication interaction data, and adds local information of the BLUETOOTH device scanning end for packaging.

As a preference, BLUETOOTH connection tracking realizing a frequency hopping action by continuously switching frequency channels corresponds to the BLUETOOTH device scanning end automatically adjusting a frequency hopping path according to frequency hopping route information.

As a preference, the action of acquiring the RSSI signal strength is performed through a BLUETOOTH device scanning end connected to the BLUETOOTH master device.

As a preference, step S64 is completed by the BLUETOOTH master device.

As a preference, after the BLUETOOTH master device calculates the position and distance information of the mobile terminal, it is determined whether the relative distance reaches a threshold and a switch action to be executed is ascertained.

The present invention also provides a system for smart BLUETOOTH operation switching based on a beacon broadcast, comprising a mobile terminal, a BLUETOOTH device, and a central control switch, wherein the mobile terminal is provided with a BLUETOOTH host module, the BLUETOOTH device is provided with a BLUETOOTH slave module, and the mobile terminal controls the central control switch via the BLUETOOTH device by applying the above-mentioned method.

As a preference, the BLUETOOTH device comprises a BLUETOOTH master device and at least one BLUETOOTH device scanning end.

In the present invention, a BLUETOOTH device of a mobile terminal is used as a BLUETOOTH host, and a BLUETOOTH device is used as a BLUETOOTH slave to simultaneously transmit two channels of broadcasts. The two channels of broadcasts are respectively a beacon broadcast and a connectable broadcast; when a user carries a mobile terminal into a beacon broadcast signal range, the beacon signal wakes up an application program on the mobile terminal via a wake-up mechanism; even if the application program is not opened, after the application is woken up, the mobile terminal will scan the connectable broadcast, and will perform connection after the signal is scanned; after a series of verifications, it is determined that the device is a bound safe and reliable device; after that, by acquiring the BLUETOOTH signal of the mobile terminal and then through an accurate algorithm the actual position of the vehicle owner is calculated; when the vehicle owner enters the target position, the system will operate the vehicle to perform a corresponding action. In this scenario, the vehicle owner neither carries the key, nor actively opens the application on the mobile terminal, and manual operation is needless, avoiding the problem that the application program background is closed and unlocking cannot be performed, thus truly freeing the user's hands.

BRIEF DESCRIPTION OF THE DRAWINGS

In order to illustrate the embodiments of the present invention or the technical solutions in the prior art more clearly, the following will briefly introduce the drawings that need to be used in the description of the embodiments of the prior art. Obviously, the drawings in the following description are merely some embodiments of the present invention. For those of ordinary skills in the art, other drawings can be obtained according to these drawings without involving inventive efforts.

DETAILED DESCRIPTION OF THE EMBODIMENTS

The technical solutions in the embodiments of the present invention will be clearly and completely described below in conjunction with the accompanying drawings in the embodiments of the present invention. Obviously, the described embodiments are only a part of the embodiments of the present invention, rather than all the embodiments. Based on the embodiments of the present invention, all other embodiments obtained by one of the ordinary skills in the art without involving any inventive effort are within the scope of the present invention.

Embodiment 1

Figure 1:
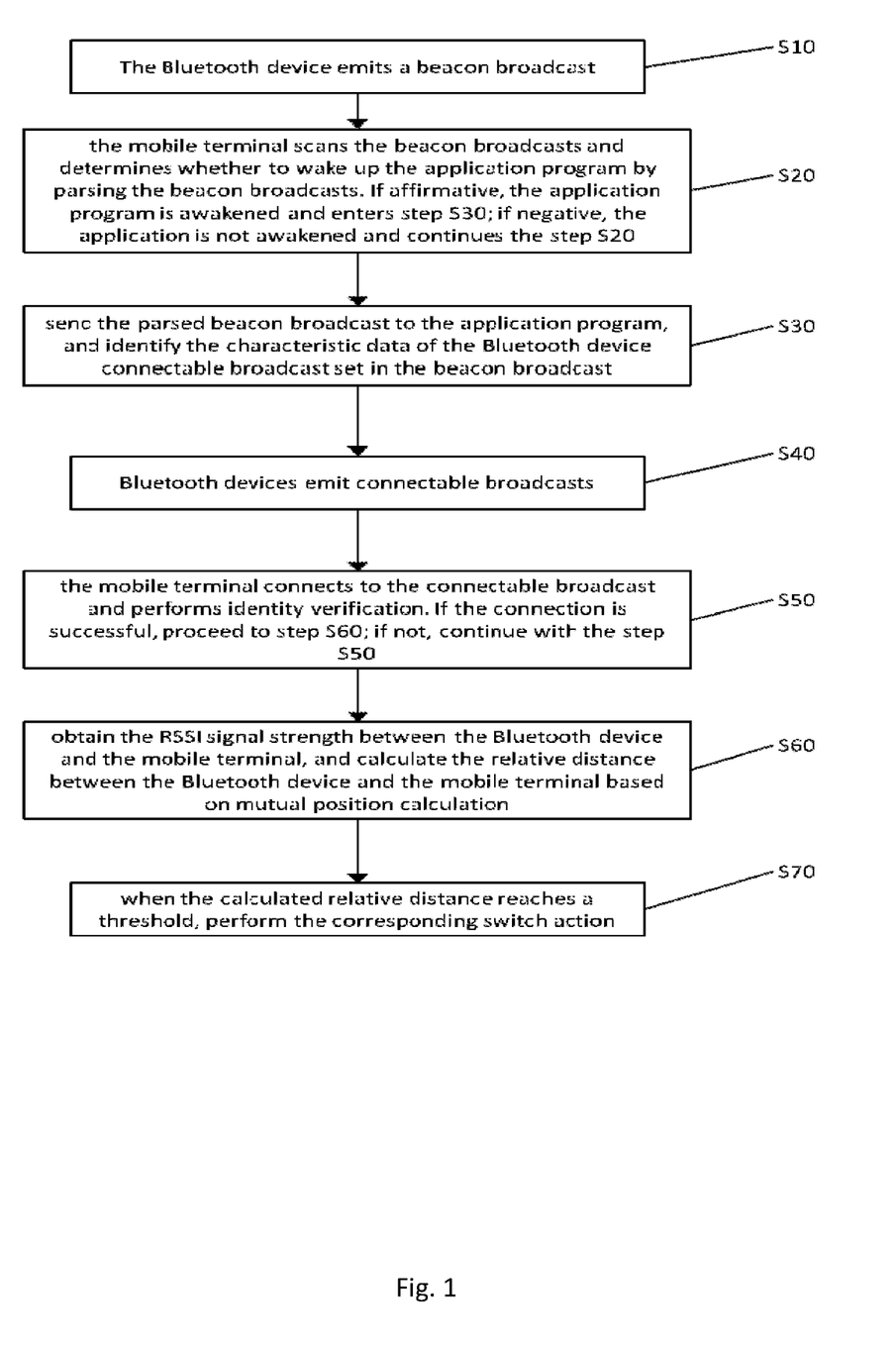
FIG. 1 is a flowchart of a method for smart BLUETOOTH operation switching based on a beacon broadcast according to the present invention.
Figure 2:
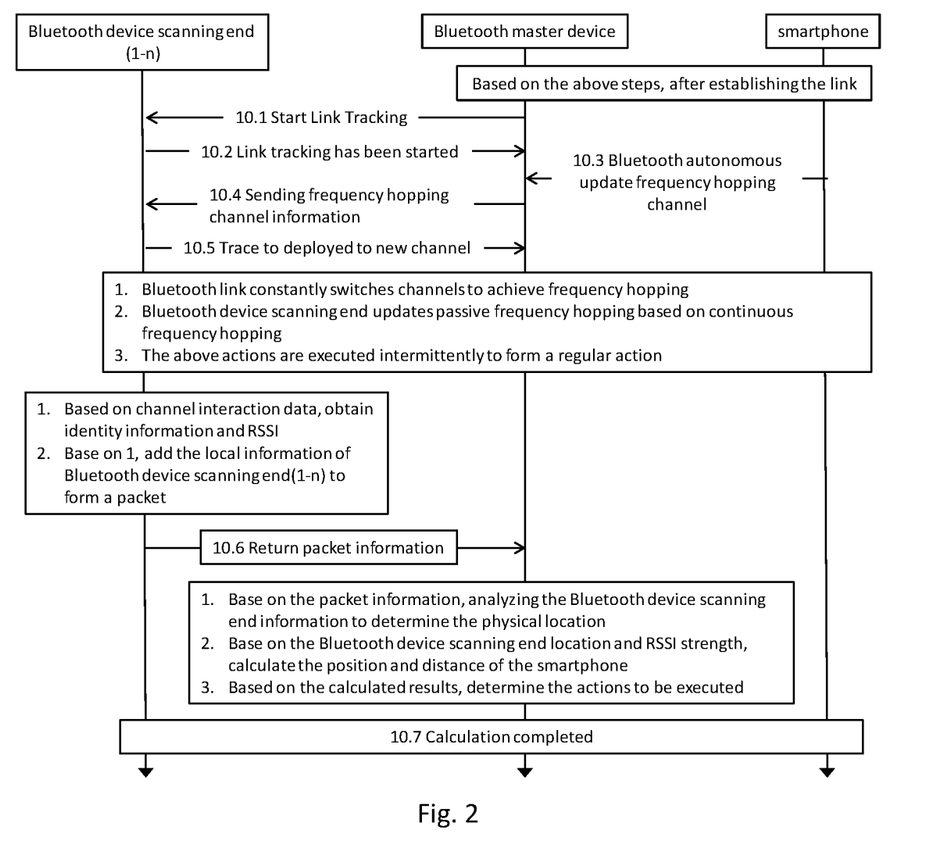
FIG. 2 is a schematic connection diagram of a method for smart BLUETOOTH operation switching based on a beacon broadcast according to the present invention.

With reference to FIG. 1, the present invention provides a method for smart BLUETOOTH operation switching based on a beacon broadcast, comprising the following steps:

S10, a BLUETOOTH device transmitting a beacon broadcast;

S20, a mobile terminal scanning the beacon broadcast and, by means of parsing the beacon broadcast, the mobile terminal determining whether to wake up an application program; if so, then waking up the application program and enter step S30; if not, then not waking up the application program and continue step S20;

S30, sending the parsed beacon broadcast to the application program, and identifying feature data of a BLUETOOTH device connectable broadcast set in the beacon broadcast;

S40, the BLUETOOTH device transmitting the connectable broadcast;

S50, the mobile terminal connecting to the connectable broadcast and performing identity verification; if the connection is successful, then entering step S60; if not, then continuing step S50;

S60, acquiring the RSSI signal strength between the BLUETOOTH device and the mobile terminal and mutually calculating position information to obtain the relative distance of the BLUETOOTH device and the mobile terminal;

and S70, when the calculated relative distance reaches a threshold, executing a corresponding switch action.

In the present embodiment, the BLUETOOTH device is equipped with two types of broadcasts, respectively being a beacon broadcast and a connectable broadcast, wherein the beacon broadcast is a non-connectable broadcast, and the two broadcasts switch and broadcast in turn, and only one broadcast is transmitting a signal at the same time. The mobile terminal in the present embodiment can be a mobile phone, a tablet computer, a mobile phone, or other mobile electronic devices. The mobile terminal supports the functions of BLUETOOTH BLE4.0 and above. The present embodiment is exemplified by a mobile phone.

When a user holds a mobile phone to approach a BLUETOOTH device, the mobile phone scans beacon broadcast information transmitted by the BLUETOOTH device, parses a field corresponding to the beacon broadcast through a mobile phone background BLUETOOTH scanning program, and determines whether to wake up a corresponding application program according to the field. Application programs of the present embodiment include, but are not limited to, various kinds of BLUETOOTH unlocking APPs. If it is determined through the parsed field that it is a registered BLUETOOTH device that is authenticated in advance, then wake up a corresponding BLUETOOTH unlocking APP. At the same time, the mobile phone sends an APP-wakeup-success signal to the BLUETOOTH device, and the BLUETOOTH device stops transmitting a beacon broadcast at this time and starts transmitting a connectable broadcast.

The awakened APP identifies feature data of a BLUETOOTH device connectable broadcast set in the beacon broadcast by system parsing and incoming beacon broadcast information, and connects a designated connectable broadcast signal, thereby establishing a connection with the BLUETOOTH device. In the connecting process, the BLUETOOTH device sends an identity verification request to the mobile phone, and the mobile phone sends identity information to the BLUETOOTH device; if the verification is that it has passed the authentication and registration, the verification is successfully completed, and the connection is successful.

After the connection is successful, obtaining the relative distance between the BLUETOOTH device and the mobile terminal is achieved by acquiring the RSSI signal strength between the BLUETOOTH device and the mobile terminal, and mutually calculating position information. In the present embodiment, the RSSI signal strength comes from a link heartbeat packet between the mobile terminal and the BLUETOOTH device, the specific method comprising:

S61, the BLUETOOTH device starting BLUETOOTH link tracking to monitor the current channel connecting condition in real time;

S62, the mobile terminal automatically updating a frequency hopping path according to the current channel connecting condition and sending the same to the BLUETOOTH device;

S63, the BLUETOOTH device tracking and deploying to a new frequency hopping path in real time according to the frequency hopping path information, and packaging the information;

and S64, parsing information about the BLUETOOTH device according to the packet information, ascertaining a physical position of a scanning end of the BLUETOOTH device, and calculating the position and distance information about the mobile terminal according to the RSSI signal strength fed back by the physical position.

The present embodiment applies to the scenario when a mobile phone acts as a BLUETOOTH host and only a single BLUETOOTH device acts as a BLUETOOTH slave. The RSSI signal strength in this embodiment comes from the RSSI generated by the link between the BLUETOOTH device and the mobile phone, the RSSI action is acquired through the BLUETOOTH device and the position of the mobile phone is calculated through the BLUETOOTH device. The present embodiment monitors the BLUETOOTH channel usage in real time through link tracking, and automatically updates the frequency hopping path for the channel occupancy. When the acquired RSSI signal strength is relatively stable, then calculating position information is performed via the BLUETOOTH device, thereby avoiding the need to continuously send a positioning broadcast between the mobile phone and the BLUETOOTH device, and transmitting back the packet information and sending an action instruction; after the mobile phone is connected to the BLUETOOTH device, the BLUETOOTH device automatically updates the frequency hopping path, and acquires an RSSI signal strength in real time such that the BLUETOOTH device ascertains the physical position of the mobile phone and the relative distance according to the packet information, ascertains an action that needs to be executed according to the size of the calculated relative distance, directly controls a switch without sending an instruction between the mobile phone and the BLUETOOTH device, and then controls the switch, which greatly increases the efficiency when the switch is operated without a key.

Embodiment 2

The present embodiment is slightly different from the above-mentioned application scenario of embodiment 1. In the present embodiment, the BLUETOOTH device comprises a BLUETOOTH master device and multiple BLUETOOTH device scanning ends; the RSSI signal strength in the present embodiment comes from a link heartbeat packet between the mobile terminal and the BLUETOOTH device scanning end; the action of acquiring the RSSI signal strength is performed via multiple BLUETOOTH device scanning ends connected to the BLUETOOTH master device, specifically:

S61, the BLUETOOTH device scanning end starting BLUETOOTH link tracking to monitor the connecting condition between the current mobile terminal and the current BLUETOOTH master device in real time;

S62, the BLUETOOTH device scanning end performing autonomous frequency hopping tracking according to the connecting condition between the current mobile terminal and the current BLUETOOTH master device;

S63, the BLUETOOTH device scanning end intercepting packet data between the current mobile terminal and the current BLUETOOTH master device according to the connecting condition between the two;

and S64, according to the packet information, parsing the physical position of the BLUETOOTH device scanning end and the RSSI signal strength fed back by the BLUETOOTH device scanning end, and according to the physical position and the RSSI signal strength fed back correspondingly, calculating position and distance information between the mobile terminal and the BLUETOOTH master device.

Specifically, in step S61, after establishing a connection between a mobile terminal and a BLUETOOTH master device, the BLUETOOTH master device sends connection channel frequency hopping route information to multiple BLUETOOTH device scanning ends; multiple BLUETOOTH device scanning ends realize autonomous frequency hopping according to the frequency hopping route information; and after frequency hopping to a corresponding channel is performed, the current channel connecting condition is monitored in real time;

in step S62, after the BLUETOOTH master device is connected to the mobile terminal, frequency hopping route information is sent to the BLUETOOTH scanning end, and the BLUETOOTH scanning end deploys a new frequency hopping path according to the route information;

in step S63, after acquiring the connected frequency hopping route information, the BLUETOOTH master device sends the same to multiple BLUETOOTH device scanning ends, and multiple BLUETOOTH device scanning ends deploy to a new frequency hopping path in real time according to the frequency hopping route, track the interaction data, and transmit back packet information to the BLUETOOTH master device;

in step S64, the interaction information between the BLUETOOTH master device and the mobile terminal, and the physical position information about the BLUETOOTH device scanning end are parsed according to the packet information; the RSSI signal strength is extracted according to the interaction information; the relative position and distance information between the BLUETOOTH master device and the mobile terminal are ascertained according to the physical position information about the multiple BLUETOOTH device scanning ends and the RSSI signal strength.

In the present embodiment, multiple BLUETOOTH device scanning ends achieve the fact of keeping consistent with the connecting frequency channel of the BLUETOOTH master device according to the frequency hopping route information, and ensure to update the frequency hopping path in real time, especially when the scenario in which the present embodiment is located needs to be applied to multiple BLUETOOTH device scanning ends for positioning calculation. In order to obtain a stable channel, monitoring the usage condition of the BLUETOOTH channel in real time is performed through link tracking, and automatically achieving the update of the frequency hopping path is performed for the channel occupation condition. For example, there are a total of 40 BLUETOOTH channels, of which 37, 38, and 39 are broadcast channels. A relatively large number of devices sending broadcasts is provided in the 37, 38, and 39 channels in the environment, and the channels are easy to collide, easily leading to data packet loss, RSSI instability, etc. Channels 1-36 are link paths. Once the connection is established, the data interaction constantly undergoes frequency hopping. Moreover, both parties in the connection will monitor the wireless signal in the air to ascertain whether the current frequency channel is occupied. The method proposed in the present application jumps a frequency channel according to the channel occupation condition, and monitors the condition of a BLUETOOTH connection such that the RSSI acquired between the mobile phone and the BLUETOOTH device is relatively stable, the possibility of being interfered is relatively small, the final "source data" is relatively stable, and the development of an algorithm is relatively easy.

The packet information in the present embodiment extracts the identity information about a mobile terminal and the RSSI signal strength information according to communication interaction data, and adds local information about a BLUETOOTH device scanning end to perform packaging. After packaging, the packet information is transmitted back to the BLUETOOTH master device end; the BLUETOOTH master device parses the information about the BLUETOOTH device scanning end according to the packet information, ascertains the physical position of the BLUETOOTH device scanning end, acquires the RSSI signal strength according to the physical position, and calculates the position and distance information about the mobile terminal; after calculating the position and distance information about the mobile terminal, the BLUETOOTH master device determines whether the relative distance reaches a threshold, and ascertains the switch action to be executed.

After the mobile phone is connected to the BLUETOOTH master device, the BLUETOOTH device autonomously updates a frequency hopping path to the BLUETOOTH master device, and the BLUETOOTH link continuously switches the frequency channel to realize frequency hopping; the BLUETOOTH device scanning end continuously realizes passive frequency hopping updating according to the frequency hopping signal by receiving an updating frequency hopping signal from the BLUETOOTH master device so as to stably acquire the RSSI signal strength. The BLUETOOTH master device parses the information about the BLUETOOTH device scanning end according to the packet information, ascertains the physical position of the BLUETOOTH device scanning end, acquires the RSSI signal strength according to the physical position, calculates the position and distance information about the mobile phone, ascertains the action that needs to be executed, and directly controls the switch such that the switch can be controlled without transferring packet information between the mobile phone and the BLUETOOTH master device and also without sending an action instruction. The present application greatly increases the efficiency when the switch is operated without a key.

Embodiment 3

The present embodiment provides a system for smart BLUETOOTH operation switching based on a beacon broadcast, including a mobile terminal, a BLUETOOTH device, and a central control switch. The mobile terminal is provided with a BLUETOOTH host module, the BLUETOOTH device is provided with a BLUETOOTH slave module, and the mobile terminal controls the central control switch via the BLUETOOTH device through the method proposed in embodiment 1 or 2.

The application scenario of the present embodiment can be directed to a door lock. When a user carries a mobile phone to enter a certain area of his home door and the range of the beacon broadcast signal, the beacon signal wakes up an application on the mobile phone (even if the application is not opened) via a wake-up mechanism. When the application is woken up, the mobile phone will scan another channel of the connectable broadcast. After a signal is scanned, a connection will be performed. After a series of verifications, it is determined that the device is a bound safe and reliable device, and a door is automatically opened. When the user carries the mobile phone a certain distance away from his home door, the door is automatically locked. The certain area in the present embodiment can be set by user customization, which can be a distance of 1 m or 2 m. The problem in the above scenario can be easily solved with the assistance of a series of peripheral host BLUETOOTH devices. Of course, the object of operating the switch in the present embodiment may also be other hardware in the whole home system, such as the control of various smart lights, smart air conditioners, etc.

To ensure an accurate calculation of the distance, multiple BLUETOOTH device scanning ends may be added, exemplified below by the switching operation of an automobile.

A set of a system for a smart BLUETOOTH operation switching based on a beacon broadcast is installed on a vehicle. The system comprises the above-mentioned BLUETOOTH device and central control switch; the BLUETOOTH device comprises a BLUETOOTH main device and multiple BLUETOOTH device scanning ends; the vehicle owner carries a mobile phone installed with a corresponding application program to approach the vehicle; it is woken up immediately after the mobile phone scans a beacon broadcast, and then connects with the BLUETOOTH main device in the system; after the connection is successful, the BLUETOOTH main device in the system notifies the state to the multiple other BLUETOOTH device scanning ends in the system; a broadcast signal of the mobile phone scanned by the BLUETOOTH device scanning ends is detected via multiple positions, and acquiring position information about the mobile phone end after positioning and calculating according to packet information transmitted by the BLUETOOTH device scanning ends via the BLUETOOTH master device, and determining an action that needs to be executed are performed. The BLUETOOTH master device is connected to the central control switch such that the action that needs to be executed is sent to the central control switch, and the corresponding vehicle door is controlled to be automatically opened and closed via the central control switch. When the vehicle owner enters a target position, the system operates the vehicle to perform the corresponding action, such as opening the vehicle door of a corresponding position, opening the welcome lamp, etc. Therefore, it is possible to open or close one vehicle door or turn on or turn off one lamp closest to the user according to the position of the user, thereby achieving the keyless opening and closing of the automobile.

In the present invention, a BLUETOOTH device of a mobile terminal is used as a BLUETOOTH host, and a BLUETOOTH device is used as a BLUETOOTH slave to simultaneously transmit two channels of broadcasts. The two channels of broadcasts are respectively a beacon broadcast and a connectable broadcast; when a user carries a mobile terminal into a beacon broadcast signal range, the beacon signal wakes up an application program on the mobile terminal via a wake-up mechanism; even if the application program is not opened, after the application is woken up, the mobile terminal will scan the connectable broadcast, and will perform connection after the signal is scanned; after a series of verifications, it is determined that the device is a bound safe and reliable device; after that, by acquiring the BLUETOOTH signal of the mobile terminal and then through an accurate algorithm the actual position of the vehicle owner is calculated; when the vehicle owner enters the target position, the system will operate the vehicle to perform a corresponding action. In this scenario, the vehicle owner neither carries the key, nor actively opens the application on the mobile terminal, and manual operation is needless, avoiding the problem that the application program background is closed and unlocking cannot be performed, thus truly freeing the user's hands.

Each embodiment in the present description is described in a progressive manner, and each embodiment focuses on the differences from other embodiments, and the same and similar parts between the various embodiments can be referred to each other.

The previous description of the disclosed embodiments is provided to enable those skilled in the art to implement or use the present invention. Various modifications to these embodiments will be readily apparent to those skilled in the art, and the generic principles defined herein may be implemented in other embodiments without departing from the spirit or scope of the present invention. Therefore, the present invention is not to be limited to the embodiments shown herein, but is to be accorded with the widest scope consistent with the principles and novel features disclosed herein.

We claim:

1. A method for a smart BLUETOOTH operation switching based on a beacon broadcast, comprising steps of:
    S10, a BLUETOOTH device transmitting the beacon broadcast;
    S20, a mobile terminal scanning the beacon broadcast and, by parsing the beacon broadcast to obtain a parsed beacon broadcast, the mobile terminal determining whether to wake up an application program; when determined yes, then waking up the application program and entering step S30; when determined no, then not waking up the application program and continuing step S20;
    S30, sending the parsed beacon broadcast to the application program, and identifying feature data of a BLUETOOTH device connectable broadcast set in the beacon broadcast;
    S40, the BLUETOOTH device transmitting a connectable broadcast;
    S50, the mobile terminal connecting to the connectable broadcast and performing an identity verification; when a connection is successful, then entering step S60; when the connection is not successful, then continuing step S50;
    S60, acquiring a received signal strength indicator (RSSI) signal strength between the BLUETOOTH device and the mobile terminal and mutually calculating position information to obtain a relative distance of the BLUETOOTH device and the mobile terminal; and
    S70, when the relative distance reaches a threshold, executing a corresponding switch action;
    wherein in step S60, the BLUETOOTH device comprises a BLUETOOTH master device and at least one BLUETOOTH device scanning terminal, and the RSSI signal strength comes from a link heartbeat packet between the mobile terminal and the BLUETOOTH device, S60 comprises steps of:
    S61, the at least one BLUETOOTH device scanning terminal starting a BLUETOOTH link tracking to monitor a connecting condition between a current mobile terminal and a current BLUETOOTH master device in real time;
    S62, the at least one BLUETOOTH device scanning terminal performing an autonomous frequency hopping tracking according to the connecting condition between the current mobile terminal and the current BLUETOOTH master device;

S63, establishing packet information according to connecting information between the current mobile terminal and the current BLUETOOTH master device, and local information of the at least one BLUETOOTH device scanning terminal; and S64, according to the packet information, parsing a physical position of the at least one BLUETOOTH device scanning terminal and a RSSI signal strength fed back by the at least one BLUETOOTH device scanning terminal, and according to the physical position and the RSSI signal strength fed back correspondingly, calculating relative position and distance information between the mobile terminal and the BLUETOOTH master device.

2. The method according to claim 1, wherein, in step S61, by establishing a connection between the mobile terminal and the BLUETOOTH master device, the BLUETOOTH master device sends connection channel frequency hopping route information to the at least one BLUETOOTH device scanning terminal; the at least one BLUETOOTH device scanning terminal realizes an autonomous frequency hopping according to the channel frequency hopping route information; and after the autonomous frequency hopping to a corresponding channel is performed, a current channel connecting condition is monitored in real time;

in step S62, after the BLUETOOTH master device is connected to the mobile terminal, the channel frequency hopping route information is sent to the at least one BLUETOOTH device scanning terminal, and the at least one BLUETOOTH device scanning terminal deploys a first frequency hopping path according to the channel frequency hopping route information to obtain connected channel frequency hopping route information;

in step S63, after acquiring the connected channel frequency hopping route information, the BLUETOOTH master device sends the connected channel frequency hopping route information to the at least one BLUETOOTH device scanning terminal, and the at least one BLUETOOTH device scanning terminal deploys to a second frequency hopping path in real time according to the connected channel frequency hopping route information, tracks interaction data, and transmits back the packet information to the BLUETOOTH master device;

in step S64, interaction information between the BLUETOOTH master device and the mobile terminal, and physical position information about the at least one BLUETOOTH device scanning terminal are parsed according to the packet information; the RSSI signal strength is extracted according to the interaction information; the relative position and distance information between the BLUETOOTH master device and the mobile terminal is ascertained according to the physical position information about the at least one BLUETOOTH device scanning terminal and the RSSI signal strength.

3. The method according to claim 2, wherein the packet information extracts identity information of the mobile terminal and RSSI signal strength information according to communication interaction data, and adds the local information of the at least one BLUETOOTH device scanning terminal for packaging.

4. The method according to claim 2, wherein a BLUETOOTH connection tracking realizes a frequency hopping action by continuously switching frequency channels to correspond to the at least one BLUETOOTH device scanning terminal automatically adjusting a frequency hopping path according to the connected channel frequency hopping route information.

5. The method according to claim 2, wherein an action of acquiring the RSSI signal strength is performed through the at least one BLUETOOTH device scanning terminal connected to the BLUETOOTH master device.

6. The method according to claim 2, wherein step S64 is completed by the BLUETOOTH master device.

7. The method according to claim 6, after the BLUETOOTH master device calculates the relative position and distance information between the BLUETOOTH master device and the mobile terminal, determining whether the relative distance reaches the threshold and ascertaining the corresponding switch action needing to be executed.

8. A system for the smart BLUETOOTH operation switching based on the beacon broadcast, comprising the mobile terminal, the BLUETOOTH device, and a central control switch, wherein the mobile terminal is provided with a BLUETOOTH host module, the BLUETOOTH device is provided with a BLUETOOTH slave module, and the mobile terminal controls the central control switch via the BLUETOOTH device by applying the method according to claim 1.

9. The system according to claim 8, wherein the BLUETOOTH device comprises a BLUETOOTH master device and at least one BLUETOOTH device scanning terminal.

10. The system according to claim 8, wherein, in step S61, by establishing a connection between the mobile terminal and the BLUETOOTH master device, the BLUETOOTH master device sends connection channel frequency hopping route information to the at least one BLUETOOTH device scanning terminal; the at least one BLUETOOTH device scanning terminal realizes an autonomous frequency hopping according to the channel frequency hopping route information; and after the autonomous frequency hopping to a corresponding channel is performed, a current channel connecting condition is monitored in real time;

in step S62, after the BLUETOOTH master device is connected to the mobile terminal, the channel frequency hopping route information is sent to the at least one BLUETOOTH device scanning terminal, and the at least one BLUETOOTH device scanning terminal deploys a first frequency hopping path according to the channel frequency hopping route information to obtain connected channel frequency hopping route information;

in step S63, after acquiring the connected channel frequency hopping route information, the BLUETOOTH master device sends the connected channel frequency hopping route information to the at least one BLUETOOTH device scanning terminal, and the at least one BLUETOOTH device scanning terminal deploys to a second frequency hopping path in real time according to the connected channel frequency hopping route information, tracks interaction data, and transmits back the packet information to the BLUETOOTH master device;

in step S64, interaction information between the BLUETOOTH master device and the mobile terminal, and physical position information about the at least one BLUETOOTH device scanning terminal are parsed according to the packet information; the RSSI signal strength is extracted according to the interaction information; the relative position and distance information between the BLUETOOTH master device and the mobile terminal is ascertained according to the physical position information about the at least one BLUETOOTH device scanning terminal and the RSSI signal strength.

11. The system according to claim 10, wherein the packet information extracts identity information of the mobile terminal and RSSI signal strength information according to communication interaction data, and adds the local information of the at least one BLUETOOTH device scanning terminal for packaging.

12. The system according to claim 10, wherein a BLUETOOTH connection tracking realizes a frequency hopping action by continuously switching frequency channels to correspond to the at least one BLUETOOTH device scanning terminal automatically adjusting a frequency hopping path according to the connected channel frequency hopping route information.

13. The system according to claim 10, wherein an action of acquiring the RSSI signal strength is performed through the at least one BLUETOOTH device scanning terminal connected to the BLUETOOTH master device.

14. The system according to claim 10, wherein step S64 is completed by the BLUETOOTH master device.

15. The system according to claim 14, after the BLUETOOTH master device calculates the relative position and distance information between the BLUETOOTH master device and the mobile terminal, determining whether the relative distance reaches the threshold and ascertaining the corresponding switch action needing to be executed.

* * * * *